United States Patent
Reichel et al.

(10) Patent No.: US 7,150,458 B2
(45) Date of Patent: Dec. 19, 2006

(54) DIVIDED STABILIZER HAVING AN OPTIMIZED SPRING RATE

(75) Inventors: Klaus Reichel, Domsühl (DE); Winfried Krüger, Parchim (DE); Stefan Beetz, Idar-Oberstein (DE); Christian Klasen, Schwerin (DE)

(73) Assignee: ZF Lemforder Metalwaren AG, Lemforde (DE)

( * ) Notice: Subject to any disclaimer, the term of this patent is extended or adjusted under 35 U.S.C. 154(b) by 108 days.

(21) Appl. No.: 10/221,907

(22) PCT Filed: Mar. 16, 2001

(86) PCT No.: PCT/DE01/01023

§ 371 (c)(1),
(2), (4) Date: Nov. 7, 2002

(87) PCT Pub. No.: WO01/68390

PCT Pub. Date: Sep. 20, 2001

(65) Prior Publication Data

US 2003/0137090 A1   Jul. 24, 2003

(30) Foreign Application Priority Data

Mar. 16, 2000   (DE) .............................. 100 12 915

(51) Int. Cl.
*B60G 21/055*   (2006.01)

(52) U.S. Cl. .................... 280/5.511; 280/124.107; 280/124.152

(58) Field of Classification Search ............. 280/5.506, 280/124.106, 124.107, 124.152, 5.511
See application file for complete search history.

(56) References Cited

U.S. PATENT DOCUMENTS

| | | | |
|---|---|---|---|
| 3,197,233 A * | 7/1965 | Van Winsen et al. .... | 280/5.502 |
| 4,648,620 A * | 3/1987 | Nuss ........................ | 280/5.511 |
| 4,919,444 A | 4/1990 | Haid et al. | |
| 5,251,926 A * | 10/1993 | Aulerich et al. ...... | 280/124.152 |
| 5,632,502 A | 5/1997 | Oppitz et al. | |
| 5,700,027 A | 12/1997 | Schiffler | |
| 5,791,444 A | 8/1998 | Schiffler | |
| 6,022,030 A * | 2/2000 | Fehring ................... | 280/5.511 |
| 6,149,166 A * | 11/2000 | Struss et al. ............. | 280/5.511 |
| 6,328,323 B1 * | 12/2001 | Elser ................... | 280/124.152 |

FOREIGN PATENT DOCUMENTS

DE   19742882 C   1/1999

(Continued)

*Primary Examiner*—Paul N. Dickson
*Assistant Examiner*—Laura B Rosenberg
(74) *Attorney, Agent, or Firm*—Horst M. Kasper (57) ABSTRACT

It is a purpose in a divided stabilizer to increase the springy lengths of the two stabilizer components. The stabilizer components (1, 1', 2, 2') have respective rotary parts (4, 4', 5, 5') attached and the rotary parts in turn have respective rotary wings (14, 16) attached. A cover flange (8') is formed at the outer rotary part (4'). An outer rotary wing (14) is radially inwardly directed and attached to the outer rotary part (4'). An inner rotary wing (16) is radially outwardly directed and is attached to the inner rotary part (5'). A second stabilizer part (2, 2') is attached to the inner rotary part (5'), wherein the outer rotary part (4') with the outer rotary wing (14) moves relative to the liner rotary part (5') with the inner rotary wing (16) up to the point where the outer rotary wing (14) contacts the inner rotary wing (16). The rotary wings (14, 16) are rotatable relative to each other up to a predetermined angle. The stabilizer is coordinated in parallel to an axle of a vehicle.

58 Claims, 3 Drawing Sheets

FOREIGN PATENT DOCUMENTS

| | | | |
|---|---|---|---|
| EP | 428439 A1 * | 5/1991 | |
| FR | 2657566 A1 * | 8/1991 | |
| GB | 895 095 A | 5/1962 | |
| GB | 2275661 A | 9/1994 | |
| JP | 03186424 A * | 8/1991 | |

* cited by examiner

Fig. 4

DIVIDED STABILIZER HAVING AN OPTIMIZED SPRING RATE

(b) CROSS-REFERENCE TO RELATED APPLICATIONS (not applicable)

(c) STATEMENT REGARDING FEDERALLY SPONSORED RESEARCH OR DEVELOPMENT (not applicable)

(d) INCORPORATION-BY-REFERENCE OF MATERIAL SUBMITTED ON A COMPACT DISC (See 37 CFR 1.52(e)(5) and MPEP 608.05. Computer program listings (37 CFR 1.96(c)), "Sequence Listings" (37 CFR 1.821(c)), and tables having more than 50 pages of text are permitted to be submitted on compact discs.) or REFERENCE TO A "MICROFICHE APPENDIX" (See MPEP 608.05(a). "Microfiche Appendices" were accepted by the Office until Mar. 1, 2001.) (not applicable)

(e) BACKGROUND OF THE INVENTION (1) Field of the Invention

The invention relates to a subdivided stabilizer according to the features of the preamble of claim 1.

Such stabilizers are employed in particular in vehicular technology.

(2) Description of Related Art Including Information Disclosed Under 37 CFR 1.97 and 1.98.

A stabilizer is coordinated in principle to each axle of a motor vehicle, wherein the stabilizer operates according to the torsion bar principle, and wherein the stabilizer is disposed parallel to the vehicle axle, and wherein the stabilizer is attached at two ends at the wheel suspension. This stabilizer prevents or, respectively, attenuates substantially the transfer of the rolling motions caused by the roadway situation and starting with the wheels onto the vehicle. Such rolling motions occur in particular in roadway curves or in case of non-even road conditions.

Single piece stabilizers are constructed in their dimensioning and their material qualities to a predetermined spring rate such that the stabilizers accept the torsion forces only in a certain order of magnitude and are capable to furnish corresponding counter forces. Therefore single piece stabilizers react to different loads either too soft or too hard, which is disadvantageous with respect to driving comfort. For this reason single piece stabilizers are in principal only conditionally suited for motor vehicles, where the motor vehicles are furnished both for the use of the road as well as the use cross-country. Therefore a subdivided stabilizer is employed in vehicles intended for the road and for cross-country wherein the two stabilizer parts of the stabilizer are connected to each other through an actuator.

Such an actuator can for example be a hydraulic swivel motor, as is described in the German printed Patent DE 19742882 C1 of the applicant or the actuator can also be an elastic revolving turret as is known from the German printed Patent DE 4342360 C2. Another actuator is known from the German printed Patent DE 19923100 C1 of the applicant, which actuator is performed as a switchable coupling or a clutch and which actuator is furnished additionally with a coupling piece connecting the stabilizer parts shape matchingly to each other.

Each of these actuators in principle comprises an outer rotary part, wherein the outer rotary part is connected to one of the two stabilizer parts through a cover and the flange, and an inner rotary part, wherein the inner rotary part is connected to the other stabilizer part through a shaft. The two rotary parts are furnished rotatable against each other over a limited angle. Conventional clamping sleeves or screw sleeves are applied as connection parts between the flange and the one stabilizer part as well as between the shaft and the other stabilizer part in general. Such subdivided stabilizers are suitable for the most different requirements. The divided stabilizers are however associated with an essential disadvantage. Thus each actuator represents a compact unit with a substantial longitudinal extension, which longitudinal extension to a corresponding degree loads the effective spring length of the two stabilizer parts.

The same spring paths entail thereby higher torsion tensions in the two stabilizer parts, which requires at the same time higher spring rates. The higher spring rates lead to a loss in quality and in the lowering of the driving comfort.

BRIEF SUMMARY OF THE INVENTION

There exists therefore the task to optimally increase the effective springing lengths of the two stabilizer parts of a subdivided stabilizer of the present kind.

This object is accomplished by the characterizing features of claim 1. Advantageous embodiments result from the claims 2 and 3.

The invention eliminates the recited disadvantages of the state-of-the-art.

The invention is to be explained in more detail in the following by way of two embodiment examples.

(g) BRIEF DESCRIPTION OF THE SEVERAL VIEWS OF THE DRAWING(S)

There is shown in:

FIG. 2: an actuator in the embodiment of a rotary clutch in a sectional view along the plane AA of FIG. 3, FIG. 3: another sectional plane of the rotary clutch.

DETAILED DESCRIPTION OF THE INVENTION

Figure 1:
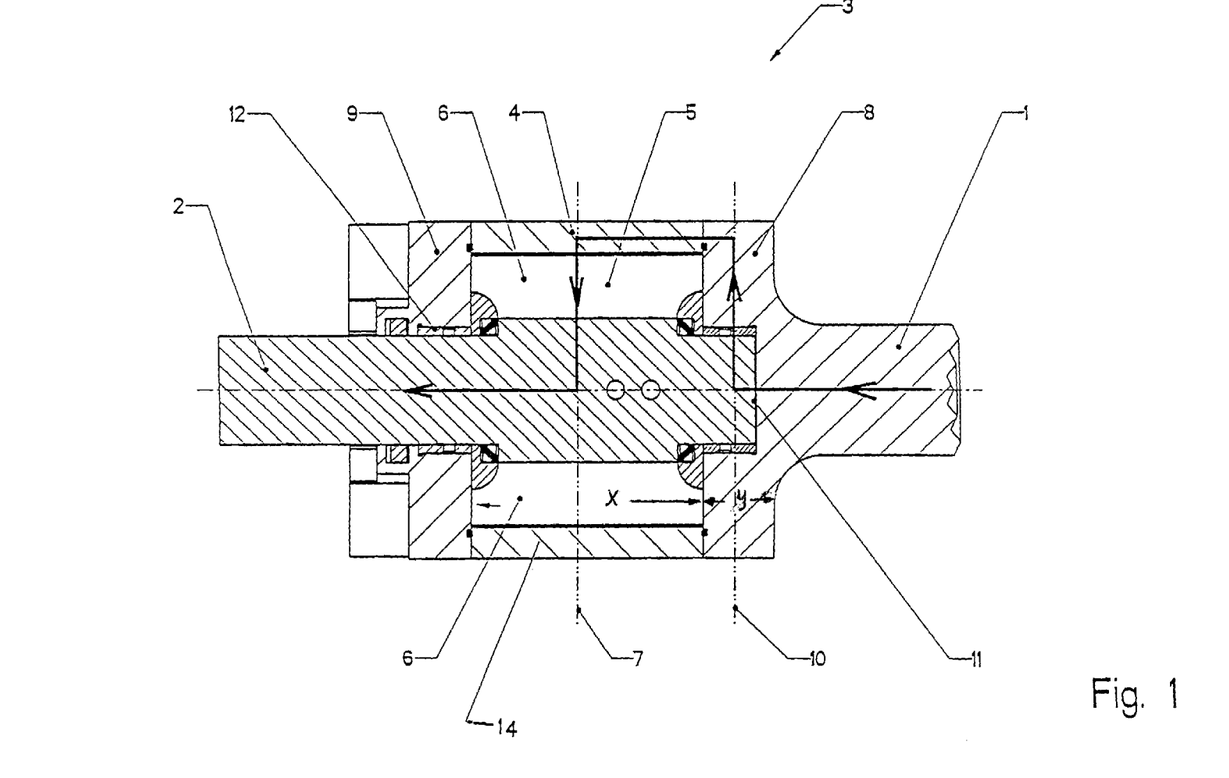
FIG. 1: an actuator in the structure of a hydraulic swivel motor.

A subdivided stabilizer comprises a first stabilizer part 1 and a second stabilizer part 2, which stabilizer part 1 and stabilizer part 2 are both connected through a hydraulic swivel motor 3 according to a first embodiment illustrated in FIG. 1. Both the two stabilizer parts 1 and 2 as well as the hydraulic swivel motor 3 are disposed on a common axis. Here the swivel motor 3 comprises an outer rotary part 4 and an inner rotary part 5, wherein the outer rotary part 4 is furnished with at least one outer rotary wing not illustrated here, wherein the rotary wing in each case is fixedly connected to the outer rotary part 4 over a certain torque transferring axial length x and wherein the rotary wing is directed radially inwardly. The inner rotary part 5 is furnished with at least one inner rotary wing 6, wherein the inner rotary wing 6 is fixedly connected to the inner rotary part 5 over the same torque transferring axial length x and wherein the inner rotary wing 6 is directed radially outwardly. Here the outer rotary wing and the inner rotary wing 6 are furnished in their structure such that the outer rotary wing and the inner rotary wing 6 form between themselves at least two free spaces. The outer rotary wings and the inner rotary wings 6 are freely rotatable relative to each other in the region of these free spaces until the outer rotary wing and the inner rotary wing 6 come to rest on a mutual stop.

The kind of and therewith the force transferring axial length x of the respective attachment between the outer rotary part 4 and the outer rotary wing or, respectively between the inner rotary part 5 and the inner rotary wing 6 are determined by the torque to be transferred.

In contrast the size of the outer rotary wing and of the inner rotary wing 6 results from the torque to be generated by the hydraulic swivel motor 3. The torque generating axial length is the basis of this size of the outer and of the inner rotary wing 6, wherein the torque generating axial length in this example embodiment corresponds to the torque transferring length. However, it is also possible that the torque transferring length of the two rotary wings 6 is smaller than their rotary torque generating length.

The outer rotary wings and the inner rotary wings 6 therefore are disposed on a common first radial force transferring plane 7 for force transfer from the axis of the second stabilizer part 2 with the outer rotary part 4 and backward. This first radial force transferring plane 7 is illustrated as a dash dotted line for better pictorialization.

The outer rotary part 4 with its outer rotary wing and the inner rotary part 5 with its inner rotary wing 6 find an axial closure through a cover flange 8 on the one hand and through a bearing cover 9 on the other hand such that the free spaces between the outer and the inner rotary wing 6 are formed as pressure chambers. These pressure chambers are sealed toward the outside and toward the inside in a corresponding way and are connected to a hydraulic plant.

The cover flange 8 is formed in a particular way as a single piece together with the first stabilizer part 1 and the cover flange 8 therefore has on the one hand a form and corresponding dimensions, which allow a cover function at the hydraulic swivel motor 3 and on the other hand a torque transferring function. Here the torque transferring function is determined essentially by the axial length of the cover flange 8, wherein the axial length of the cover flange 8 therewith represents a further force transferring length y, namely for the force transfer from the first stabilizer part 1 and the outer rotary part 4 and backward. Thus there results a second radial force transfer The cover flange 8 is furnished on its inner side with the finite bearing hole 11 for receiving the second stabilizing part 2 with its inner rotary part 5. The bearing cover 9 disposed on the oppositely situated side of the hydraulic swivel motor 3 is constructed conventionally and therefore also has a passing through bearing bore 12 for receiving of the inner rotary part 5. Both the bearing cover 9 as well as the cover flange 8 are attached at the outer rotary part 4 by way of screws or, respectively, by a welding connection not illustrated. The inner rotary part 5 is now in a particular way forming one part with the second stabilizer part 2 and is supported in the bearing cover 9 and the cover flange 8. For this purpose, the inner rotary part 5 has dimensions up to over the region of the first radial force transfer plane 7, wherein the dimensions coincide substantially with the dimensions of the second stabilizer part 2. The inner rotary wings 6 are attached on the inner rotary part 5 in a conventional way by gear teeth, by clamping or the like.

A force flux results with a corresponding and different load of the two stabilizer parts 1, 2, wherein the force extends on the one hand in the arrow direction drawn, for example within the first stabilizer part 1 and in axial direction up to second radial force transfer plane 10, wherein the force flux extends on this radial force transfer plane 10 up to the high level of the outer rotary part 4, wherein the force flux propagates furthermore within the outer rotary part 4 in axial direction up to the first radial force transfer plane 7 and wherein the force flux expands on this first force transfer plane 7 up to the inner rotary part 5 and from there axially within the second stabilizer part 2.

Figures 2, 3:
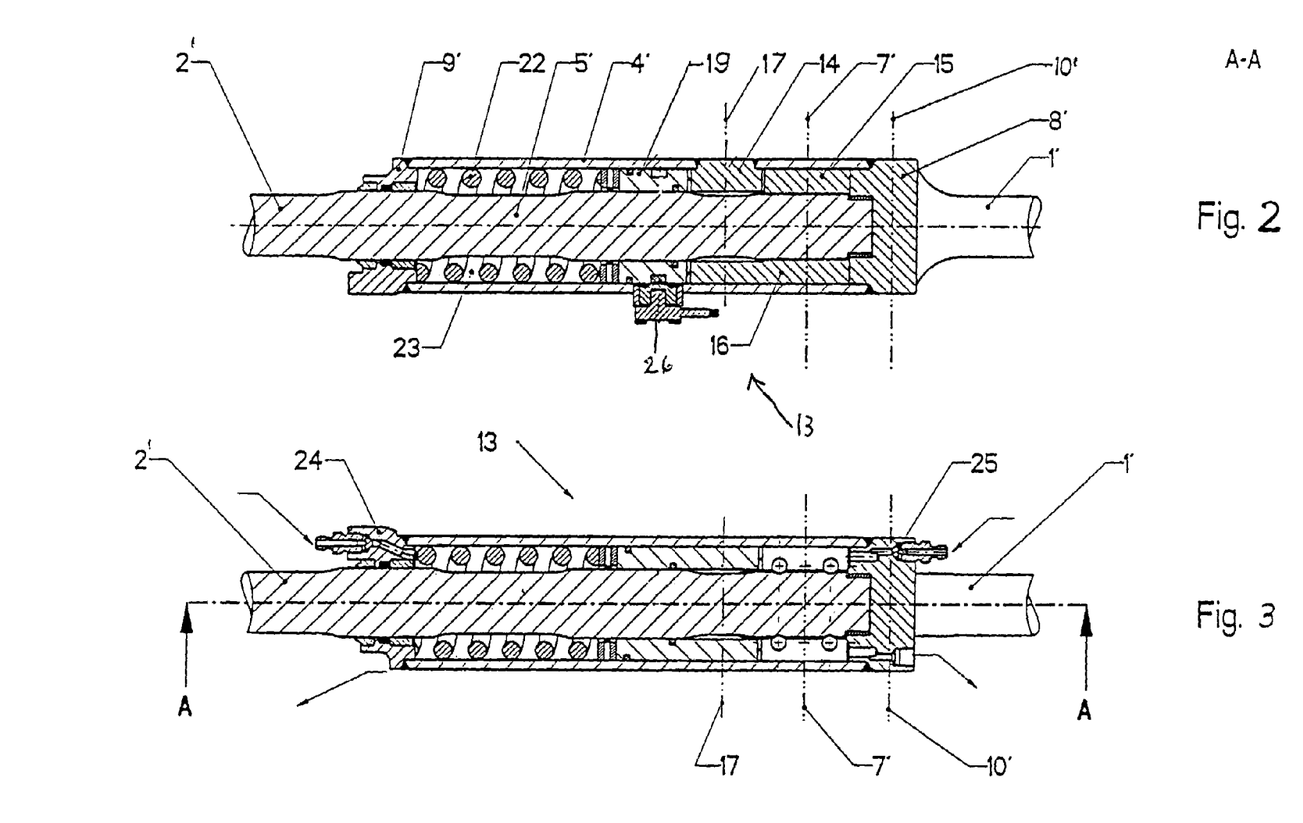
Figure 4:
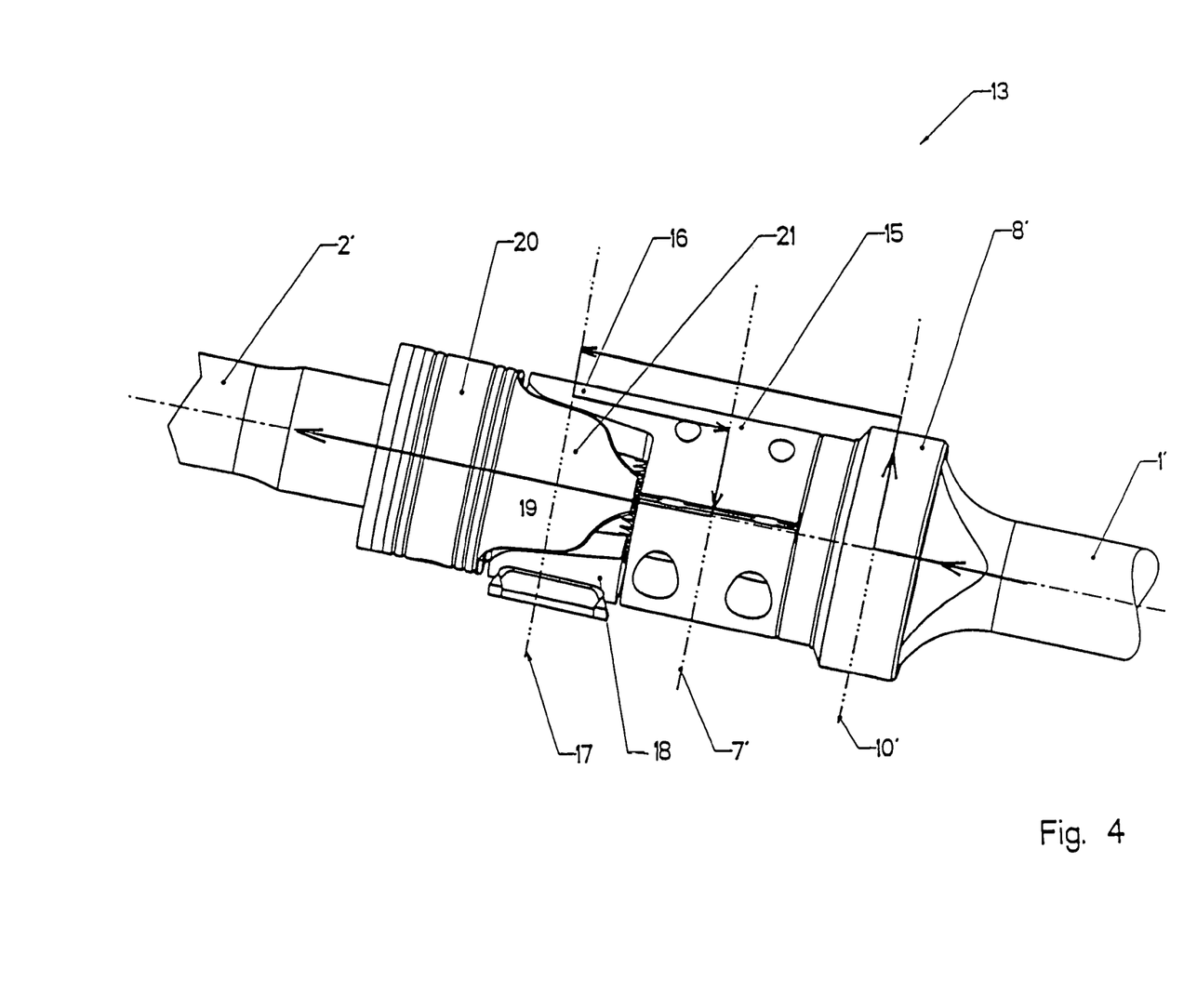
FIG. 4: a perspective partial view of essential components of the rotary clutch.

A subdivided stabilizer comprises a first stabilizer part 1' and a second stabilizer part 2' according to a second embodiment according to FIGS. 2 through 4, wherein the first stabilizer part 1' and the second stabilizer part 2' are both connected in this embodiment however with a rotary clutch 13.

The clutch 13 also has an outer rotary part 4' in the shape of a cylindrical casing, wherein the outer rotary part 4' is covered toward a front side through a cover flange 8' and is connected fixedly against rotation to the first stabilizer part 1'. Here the cover flange 8' is furnished with a force transferring axial length y, wherein the axial length y is disposed on the second force transfer plane 10'.

The outer rotary part 4' is delimited to the other front side with the bearing cover 9' and is equipped with a fixed position outer rotary wing 14, wherein the outer rotary wing 14 is directed inwardly. This rotary wing 14 is disposed at a predetermined position to be more nearly designated at another location.

The rotary clutch 13 also has an inner rotary part 5', wherein the inner rotary part 5' is formed as a single piece with the second stabilizer part 2'. This inner rotary part 5' is supported on the one hand in the bearing cover 9' and is supported on the other hand in the cover flange 8'. The inner rotary part 5' is equipped with a toothing or gearing, wherein a two-part force transfer element 15 is fixed against rotation set onto the toothing or gearing. The force transfer element 15 extends over certain defined effective force transferring length x and thus draws the first radial force transfer plane 7' between the inner rotary part 5' and the force transfer element 15. The force transfer element 15 is furthermore furnished with an inner rotary wing 16 disposed radially with respect to the inner rotary pan 5' on the front side pointing to the bearing cover 9', wherein the inner rotary wing 16 is disposed such that the inner rotary wing 16 is disposed on a radial plane together with the outer rotary wing 14 of the outer rotary part 4'. The two rotary wings 14 and 16 extend again over a certain axial force transferring length and draw this way the third radial force transfer plane 17 for force transfer between the force transfer element 15 and the outer rotary wing 14 of the outer rotary part 4'.

The inner rotary wing 16 and the outer rotary wing 14 are of such dimensions and disposed such to each other that the inner rotary wing 16 and outer rotary wing 14 form two radially and oppositely disposed free spaces 18 between themselves.

According to a further axial extension in the action of the bearing cover 9', there is disposed a coupling piece 19 slidably supported on the inner rotary part 5' next to the third radial force transfer plane 17. This coupling piece 19 comprises a guide part 20 and two equal and oppositely disposed coupling parts 21. Here the two coupling parts 21 are equipped with side ways and conically extending guide faces and the coupling parts 21 are constructed such in their dimensions that the coupling parts are capable of closing without play the two free spaces 18 between the two rotary wings 14 and 16. This coupling piece 19 is furthermore loaded by a compression spring 22, wherein the compression spring 22 is supported at the bearing cover 9' and wherein the compression spring 22 is disposed in a spring chamber 23 of the casing. The spring chamber 23 is additionally formed as a pressure space and connected to a hydraulic plant through an inlet connection piece 24. A hydraulic pressure this way to be builtup in the spring chamber 23 supports the force of the compression spring 22. The coupling piece 19 is constructed loadable with a hydraulic pressure opposing the compression spring 22 on the side disposed remote from the compression spring 22 if required, wherein a corresponding inlet opening 25 for the compression liquid is disposed in the cover flange 8'.

A sensor 26 for determining the position of the movable coupling piece 19 is disposed in the casing of the outer rotary part 4'.

The coupling piece 19 is coupled in the starting position such that the coupling parts 21 are fitted free of play in the free spaces between the two rotary wings 14, 16.

Force flow in the arrow direction recognizable from FIG. 4 results in case of a different loading of the two stabilizer parts 1, 2 for example on the one hand of the stabilizer part 1' in axial direction up to the second radial force transfer plane 10', on the second radial force transfer plane 10' up to the outer rotary part 4' and there in axial direction up to the third radial force transfer plane 17. The force flows axially back from the third radial force transfer plane 17 up to the first radial force transfer plane 7' and then through the first radial force transfer plane 7' up to the inner rotary part 5', from where the force propagates in axial direction within the second stabilizer part 2'.

The coupling parts 21 are disengaged in the decoupled state from the rotary wings 14, 16 such that initially a free angle of rotation has to be overcome for each rotary direction in case of a different load of the two stabilizer parts 1', 2' before the two rotary wings 14, 16 directly come to rest. The force flows then in the same way as in the coupled state.

LIST OF REFERENCE NUMERALS 1, 1' first stabilizer part
2, 2' second stabilizer part
3 hydraulic swivel motor
4, 4' outer rotary part
5, 5' inner rotary part
6 inner rotary wing
7, 7' first radial force transfer plane
8, 8' cover flange
9, 9' bearing cover
10, 10' second radial force transfer plane
11, 11' finite bearing bore hole
12 passing through bearing role
13 rotary clutch
14 outer rotary wing
15 force transfer element
16 inner rotary wing
17 third radial force transfer plane
18 free space
19 coupling piece
20 guide piece
21 coupling part
22 compression spring
23 spring chamber
24 inlet connection piece
25 inlet opening
26 sensor

What is claimed is:

1. A subdivided stabilizer with optimized spring rate, comprising
    a first stabilizer part (1, 1');
    a second stabilizer part (2, 2),
    an outer rotary part (4') with an outer rotary wing (14), wherein the outer rotary wing (14) is radially inwardly directed;
    an inner rotary part (5') with an inner rotary wing (16), wherein the inner rotary wing (6, 16) is radially outwardly directed,
    wherein the outer rotary part (4') with the outer rotary wing (14) and the inner rotary part (5') with the rotary wing (16) form a rotary clutch (13), and wherein the first stabilizer part (1, 1') and the second stabilizer part (2, 2') are connected to each other with the rotary clutch (13), wherein the inner rotary part (5') is rotatable relative to the outer rotary part (4') to a predetermined extent, wherein free spaces (18) for a coupling piece (19) exist between the outer rotary wing (14) and the inner rotary wing (16) and wherein the outer rotary part (4') is connected to the first stabilizer part (1') through a second radial force transfer plane (10') and wherein the inner rotary part (5') is connected to the second stabilizer part (2') through a first radial force transfer plane (7');
    a cover flange (8') formed at the outer rotary part (4') wherein the first stabilizer part (1,1') is formed as a single piece with the cover flange (8') of the outer rotary part (4') and the first stabilizer part (1,1') extends up to the second radial force transfer plane (10') with spring rate determining dimensions of the first stabilizer part (1'),
    wherein the second stabilizer part (2') is formed as a single piece with the inner rotary part (5') and extends up to the first radial force transfer plane (7') with spring rate determining dimensions of the second stabilizer part (2'), wherein a first force transferring axial length (x, y) is coordinated to the first radial force transfer plane (7'), wherein a second force transferring axial length (x, y) is coordinated to the second radial force transfer plane (10'), and wherein the first force transferring axial length (x, y) and the second force transferring axial length (x, y) are disposed immediately neighboring,
    wherein the inner rotary wing (16) of the inner rotary part (5') and the outer rotary wing (14) of the outer rotary part (4') form a third radial force transfer plane (17) and wherein the third radial force transfer plane (17) is disposed on the side of the first radial force transfer plane (7') located toward the second stabilizer part (2'),
    wherein the outer rotary wing (14) is fixedly connected to the outer rotary part (4) over a certain force transferring axial length (x), and wherein the inner rotary wing (6) is fixedly connected to the inner rotary part (5) over the same force transferring axial length (x),
    and wherein the outer rotary wing (14) and the inner rotary wing (6) are freely rotatable relative to each other in a region of the free spaces (18) until the outer rotary wing (14) and the inner rotary wing (6) come to rest on a mutual stop,
    wherein the force transferring axial length x of the attachment between the outer rotary part (4) and the outer rotary wing (14) or, respectively between the inner rotary part (5) and the inner rotary wing (6) is determined by the torque to be transferred, and wherein a size of the outer rotary wing (14) and of the inner rotary wing (6) results from the torque to be generated by a hydraulic swivel motor (3), and wherein the torque generating axial length is the basis of this size of the outer rotary wing (14) and of the inner rotary wing (6).

2. Subdivided stabilizer according to claim 1, characterized in that the second stabilizer part (2, 2') with its inner rotary part (5') is formed as a single piece and wherein the first stabilizer part (1, 1') with its cover flange (8') is formed as a single piece.

3. The subdivided stabilizer according to claim 1 further comprising a force transfer element (15) forming the first radial force transfer plane (7') and wherein the force transfer element (15) is connected fixed against rotation to the inner rotary part (5), and wherein the force transfer element (15) is connected as a single part with the inner rotary wing (16).

4. The subdivided stabilizer according to claim 1 wherein a torque generating axial length corresponds to the force transferring length x, wherein the torque is transferred from the first stabilizer part (1, 1') through the cover flange (8, 8') radially on the second radial force transferring plane (10, 10'), then axially through the outer rotary part (4, 4') to the first force transferring plane (7, 7'), then radially through the inner rotary wing (6, 16) and through the inner rotary part (5, 5') to the second stabilizer part (2, 2').

5. The subdivided stabilizer according to claim 1 wherein a torque transferring length x of the inner rotary wing (16) is smaller than a rotary torque generating length, wherein the torque is transferred in case of a different loading of the first stabilizer part (1') and of the second stabilizer part (2') from the first stabilizer part (1') in axial direction to the second radial force transfer plane (10'), then through the cover flange (8') radially on the second radial force transferring plane (10'), then in axial direction through the outer rotary part (15) to the third force transferring plane (17), then in axial direction back through the inner rotary wing (16) to the first force transferring plane (7'), then radially to the inner rotary part (5'), from where the force propagates in axial direction within the second stabilizer part (2').

6. The subdivided stabilizer according to claim 1 wherein the outer rotary part (4) with its outer rotary wing (14) and the inner rotary part (5) with its inner rotary wing (6) find an axial closure through the cover flange (8) connected with the first stabilizer part (1, 1') and through a bearing cover (9), wherein the free spaces between the outer rotary wing (14) and the inner rotary wing (6) are formed as pressure chambers sealed toward the outside and inside in a corresponding way and connected to a hydraulic plant.

7. A subdivided stabilizer with optimized spring rate, comprising a first stabilizer part (1, 1');

a second stabilizer part (2, 2), an outer rotary part (4') with an outer rotary wing (14), wherein the outer rotary wing (14) is radially inwardly directed;

an inner rotary part (5') with an inner rotary wing (16), wherein the inner rotary wing (6, 16) is radially outwardly directed, wherein the outer rotary part (4') with the outer rotary wing (14) and the inner rotary part (5') with the rotary wing (16) form a rotary clutch (13), and wherein the first stabilizer part (1, 1') and the second stabilizer part (2, 2') are connected to each other with the rotary clutch (13), wherein the inner rotary part (5') is rotatable relative to the outer rotary part (4') to a predetermined extent, wherein free spaces (18) for a coupling piece (19) exist between the outer rotary wing (14) and the inner rotary wing (16) and wherein the outer rotary part (4') is connected to the first stabilizer part (1') through a second radial force transfer plane (10') and wherein the inner rotary part (5') is connected to the second stabilizer part (2') through a first radial force transfer plane (7');

a cover flange (8') formed at the outer rotary part (4') wherein the first stabilizer part (1,1') is formed as a single piece with the cover flange (8') of the outer rotary part (4') and the first stabilizer part (1,1') extends up to the second radial force transfer plane (10') with spring rate determining dimensions of the first stabilizer part (1'), wherein the second stabilizer part (2') is formed as a single piece with the inner rotary part (5') and extends up to the first radial force transfer plane (7') with spring rate determining dimensions of the second stabilizer part (2'), wherein a first force transferring axial length (x, y) is coordinated to the first radial force transfer plane (7'), wherein a second force transferring axial length (x, y) is coordinated to the second radial force transfer plane (10'), and wherein the first force transferring axial length (x, y) and the second force transferring axial length (x, y) are disposed immediately neighboring, wherein the inner rotary wing (16) of the inner rotary part (5') and the outer rotary wing (14) of the outer rotary part (4') form a third radial force transfer plane (17) and wherein the third radial force transfer plane (17) is disposed on the side of the first radial force transfer plane (7') located toward the second stabilizer part (2'), wherein the outer rotary part (4) with its outer rotary wing (14) and the inner rotary part (5) with its inner rotary wing (6) find an axial closure through the cover flange (8) connected with the first stabilizer part (1, 1') and through a bearing cover (9), wherein the free spaces between the outer rotary wing (14) and the inner rotary wing (6) are formed as pressure chambers sealed toward the outside and inside in a corresponding way and connected to a hydraulic plant, wherein the cover flange (8) performs a cover function at a hydraulic swivel motor (3) and a torque transferring function, wherein an axial length of the cover flange (8) represents a further force transferring length y for a force transfer from the first stabilizer part (1) to the outer rotary part (4) and backward on the second radial force transfer plane (10).

8. A subdivided stabilizer with optimized spring rate, comprising a first stabilizer part (1, 1');

a second stabilizer part (2, 2), an outer rotary part (4') with an outer rotary wing (14), wherein the outer rotary wing (14) is radially inwardly directed;

an inner rotary part (5') with an inner rotary wing (16), wherein the inner rotary wing (6, 16) is radially outwardly directed, wherein the outer rotary part (4') with the outer rotary wing (14) and the inner rotary part (5') with the rotary wing (16) form a rotary clutch (13), and wherein the first stabilizer part (1, 2') and the second stabilizer part (2, 2') are connected to each other with the rotary clutch (13), wherein the inner rotary part (5') is rotatable relative to the outer rotary part (4') to a predetermined extent, wherein free spaces (18) for a coupling piece (19) exist between the outer rotary wing (14) and the inner rotary wing (16) and wherein the outer rotary part (4') is connected to the first stabilizer part (2') through a second radial force transfer plane (10') and wherein the inner rotary part (5') is connected to the second stabilizer part (2') through a first radial force transfer plane (7');

a cover flange (8') formed at the outer rotary part (4') wherein the first stabilizer part (1,1') is formed as a single piece with the cover flange (8') of the outer rotary part (4') and the first stabilizer part (1,1') extends up to the second radial force transfer plane (10') with spring rate determining dimensions of the first stabilizer part (1'), wherein the second stabilizer part (2') is formed as a single piece with the inner rotary part (5') and extends up to the first radial force transfer plane (7') with spring rate determining dimensions of the second stabilizer part (2'), wherein a first force transferring axial length (x, y) is coordinated to the first radial force transfer plane (7'), wherein a second force transferring axial length (x, y) is coordinated to the second radial force transfer plane (10'), and wherein the first force transferring axial length (x, y) and the second force transferring axial length (x, y) are disposed immediately neighboring, wherein the inner rotary wing (16) of the inner rotary part (5') and the outer rotary wing (14) of the outer rotary part (4') form a third radial force transfer plane (17) and wherein the third radial force transfer plane (17) is disposed on the side of the first radial force transfer plane (7') located toward the second stabilizer part (2'), wherein the outer rotary part (4) with its outer rotary wing (14) and the inner rotary part (5) with its inner rotary wing (6) find an axial closure through the cover flange (8) connected with the first stabilizer part (1, 1') and through a bearing cover (9), wherein the free spaces between the outer rotary wing (14) and the inner rotary wing (6) are formed as pressure chambers sealed toward the outside and inside in a corresponding way and connected to a hydraulic plant, wherein the cover flange (8) is furnished on an inner side in a finite bearing hole (11) for receiving the second stabilizing part (2) with its inner rotary part (5), wherein the bearing cover (9) comprises a passing through bearing bore (12) for receiving of the inner rotary part (5), wherein both the bearing cover (9) and the cover flange (8) are attached at the outer rotary part (4) with screws or by a welding connection, wherein the inner rotary wing (6) is attached on the inner rotary part (5) by gear teeth or by clamping.

9. A subdivided stabilizer
with optimized spring rate, comprising
a first stabilizer part (1, 1');
a second stabilizer part (2, 2),
an outer rotary part (4') with an outer rotary wing (14), wherein the outer rotary wing (14) is radially inwardly directed;

an inner rotary part (5') with an inner rotary wing (16), wherein the inner rotary wing (6, 16) is radially outwardly directed, wherein the outer rotary part (4') with the outer rotary wing (14) and the inner rotary part (5') with the rotary wing (16) form a rotary clutch (13), and wherein the first stabilizer part (1, 1') and the second stabilizer part (2, 2') are connected to each other with the rotary clutch (13), wherein the inner rotary part (5') is rotatable relative to the outer rotary part (4') to a predetermined extent, wherein free spaces (18) for a coupling piece (19) exist between the outer rotary wing (14) and the inner rotary wing (16) and wherein the outer rotary part (4') is connected to the first stabilizer part (1') through a second radial force transfer plane (10') and wherein the inner rotary part (5') is connected to the second stabilizer part (2') through a first radial force transfer plane (7');

a cover flange (8') formed at the outer rotary part (4') wherein the first stabilizer part (1, 1') is formed as a single piece with the cover flange (8') of the outer rotary part (4') and the first stabilizer part (1, 1') extends up to the second radial force transfer plane (10') with spring rate determining dimensions of the first stabilizer part (2'), wherein the second stabilizer part (2') is formed as a single piece with the inner rotary part (5') and extends up to the first radial force transfer plane (7') with spring rate determining dimensions of the second stabilizer part (2'), wherein a first force transferring axial length (x, y) is coordinated to the first radial force transfer plane (7'), wherein a second force transferring axial length (x, y) is coordinated to the second radial force transfer plane (10'), and wherein the first force transferring axial length (x, y) and the second force transferring axial length (x, y) are disposed immediately neighboring, wherein the inner rotary wing (16) of the inner rotary part (5') and the outer rotary wing (14) of the outer rotary part (4') form a third radial force transfer plane (17) and wherein the third radial force transfer plane (17) is disposed on the side of the first radial force transfer plane (7') located toward the second stabilizer part (2'), wherein the coupling piece (19) comprises
a guide part (20) and two equal and oppositely disposed coupling parts (21) equipped with side ways and conically extending guide faces, wherein the coupling parts (21) are capable of closing the free spaces (18) between the outer rotary wing (14) and the inner rotary wing (16) without play, a compression spring (22) supported at a bearing cover (9') and disposed in a spring chamber (23), wherein the spring chamber (23) is formed as a pressure space and connected to a hydraulic plant through an inlet connection piece (24), wherein the coupling piece (19) is loadable with a hydraulic pressure created in the spring chamber (23) opposing the compression spring (22) on the side disposed remote from the compression spring (22), wherein the hydraulic pressure supports the force of the compression spring (22), wherein a corresponding inlet opening (25) for a hydraulic pressure creation is disposed in the cover flange (8').

10. A subdivided stabilizer
with optimized spring rate, comprising
a first stabilizer part (1, 1');
a second stabilizer part (2, 2), an outer rotary part (4') with an outer rotary wing (14), wherein the outer rotary wing (14) is radially inwardly directed;

an inner rotary part (5') with an inner rotary wing (16), wherein the inner rotary wing (6, 16) is radially outwardly directed, wherein the outer rotary part (4') with the outer rotary wing (14) and the inner rotary part (5') with the rotary wing (16) form a rotary clutch (13), and wherein the first stabilizer part (1, 1') and the second stabilizer part (2, 2') are connected to each other with the rotary clutch (13), wherein the inner rotary part (5') is rotatable relative to the outer rotary part (4') to a predetermined extent, wherein free spaces (18) for a coupling piece (19) exist between the outer rotary wing (14) and the inner rotary wing (16) and wherein the outer rotary part (4') is connected to the first stabilizer part (1') through a second radial force transfer plane (10') and wherein the inner rotary part (5') is connected to the second stabilizer part (2') through a first radial force transfer plane (7');

a cover flange (8') formed at the outer rotary part (4') wherein the first stabilizer part (1,1') is formed as a single piece with the cover flange (8') of the outer rotary part (4') and the first stabilizer part (1,1') extends up to the second radial force transfer plane (10') with spring rate determining dimensions of the first stabilizer part (1'), wherein the second stabilizer part (2') is formed as a single piece with the inner rotary part (5') and extends up to the first radial force transfer plane (7') with spring rate determining dimensions of the second stabilizer part (2'), wherein a first force transferring axial length (x, y) is coordinated to the first radial force transfer plane (7'), wherein a second force transferring axial length (x, y) is coordinated to the second radial force transfer plane (10'), and wherein the first force transferring axial length (x, y) and the second force transferring axial length (x, y) are disposed immediately neighboring, wherein the inner rotary wing (16) of the inner rotary part (5') and the outer rotary wing (14) of the outer rotary part (4') form a third radial force transfer plane (17) and wherein the third radial force transfer plane (17) is disposed on the side of the first radial force transfer plane (7') located toward the second stabilizer part (2'), a sensor (26) for determining a position of a movable coupling piece (19) disposed in the outer rotary part (4').

11. A subdivided stabilizer
with optimized spring rate,
comprising
a first stabilizer part (1, 1');
a cover flange (8, 8'), wherein the first stabilizer part (1, 1') is formed as a single piece with the cover flange (8, 8');
an outer rotary part (4'), wherein the cover flange (8, 8') is formed at the outer rotary part (4');
an outer rotary wing (14) attached to the outer rotary part (4'), wherein the outer rotary wing (14) is radially inwardly directed;
an inner rotary wing (6, 16), wherein the inner rotary wing (6, 16) is radially outwardly directed;
an inner rotary part (5'), wherein the inner rotary wing (6, 16) is attached to the inner rotary part (5');
a second stabilizer part (2, 2'), wherein the second stabilizer part (2, 2') is attached to the inner rotary part (5'), wherein the outer rotary part (4') with the outer rotary wing (14) moves relative the inner rotary part (5') with the inner rotary wing (6, 16) up to a point where the outer rotary wing (14) contacts the inner rotary wing (6, 16), and wherein the first stabilizer part (1, 1') and the second stabilizer part (2, 2') are connected to each other with the outer rotary wing (14) and the inner rotary wing (6, 16), wherein the inner rotary part (5') is rotatable relative to the outer rotary part (4') to a predetermined extent, wherein free spaces (18) for a movable coupling piece (19) exist between the outer rotary wing (14) and the inner rotary wing (6, 16); wherein the second stabilizer part (2, 2') is formed as a single piece with the inner rotary part (5'), wherein the movable coupling piece (19) comprises
two equal and oppositely disposed coupling parts (21) equipped with side ways and conically extending guide faces, wherein the coupling parts (21) are capable of closing the free spaces (18) between the outer rotary wing (14) and the inner rotary wing (6, 16) without play;

wherein the coupling parts (21) are disengaged in the decoupled state from the outer rotary wing (14) and from the inner rotary wing (6, 16) such that initially a free angle of rotation has to be overcome for each direction in case of a different load of the first stabilizer part (1, 1') and of the second stabilizer part (2, 2') before the outer rotary wing (14) and the inner rotary wing (6, 16) come to rest.

12. The subdivided stabilizer according to claim 11 further comprising
a force transfer element (15) connected fixed against rotation to the inner rotary part (5), wherein the force transfer element (15) forms a single part with the inner rotary wing (6, 16).

13. The subdivided stabilizer according to claim 11 wherein the inner rotary wing (16) is disposed an a radial plane together with the outer rotary wing (14) of the outer rotary part (4'), wherein the outer rotary wing (14) and the inner rotary wing (16) extend over a certain axial length, wherein the inner rotary wing (16) and the outer rotary wing are of such dimensions and disposed such to each other that the inner rotary wing (16) and the outer rotary ring (14) form two radially and oppositely disposed free spaces (18) between themselves.

14. The subdivided stabilizer according to claim 11 wherein the cover flange (8, 8') is furnished on an inner side in a finite bearing hole (11) for receiving the second stabilizing part (2, 2') with its inner rotary part (5),
wherein
a bearing cover (9) comprises a passing through bearing bore (12) for receiving of the inner rotary part (5),
wherein
both the bearing cover (9) and the cover flange (8, 8') are attached at the outer rotary part (4) with screws or by a welding connection,
wherein the inner rotary wing (6) is attached at the inner rotary part (5) by gear teeth or by clamping.

15. A subdivided stabilizer
with optimized spring rate,
comprising
a first stabilizer part (1, 1');
a cover flange (8'), wherein the first stabilizer part (1, 1') is formed as a single piece with the cover flange (8');
an outer rotary part (4'), wherein the cover flange (8') is formed at the outer rotary part (4');

an outer rotary wing (14) attached to the outer rotary part (4'), wherein the outer rotary wing (14) is radially inwardly directed;

an inner rotary wing (16), wherein the inner rotary wing (6, 16) is radially outwardly directed;

an inner rotary part (5'), wherein the inner rotary wing (6, 16) is attached to the inner rotary part (5');

a second stabilizer part (2, 2'), wherein the second stabilizer part (2, 2') is attached to the inner rotary part (5'), wherein the outer rotary part (4') with the outer rotary wing (14) moves relative the inner rotary part (5') with the inner rotary wing (16) up to a point where the outer rotary wing (14) contacts the inner rotary wing (16), and wherein the first stabilizer part (1, 1') and the second stabilizer part (2, 2') are connected to each other with the outer rotary wing (14) and the inner rotary wing (16), wherein the inner rotary part (5') is rotatable relative to the outer rotary part (4') to a predetermined extent, wherein free spaces (18) for a movable coupling piece (19) exist between the outer rotary wing (14) and the inner rotary wing (16); wherein the second stabilizer part (2') is formed as a single piece with the inner rotary part (5'), wherein the outer rotary wing (14) and the inner rotary wing (6) are freely rotatable relative to each other in a region of the free spaces (18) until the outer rotary wing (14) and the inner rotary wing (6) come to rest at a mutual stop.

16. The subdivided stabilizer according to claim 15 wherein the second stabilizer part (2, 2') and the inner rotary part (5, 5')are furnished by a round rod; and wherein the first stabilizer part (1, 1') is at its end axially aligned attached to the cover flange (8, 8').

17. The subdivided stabilizer according to claim 15 further comprising a bearing cover (9) attached to the outer rotary part (4, 4'), wherein the outer rotary part (4) with its outer rotary wing (14) and the inner rotary part (5) with its inner rotary wing (6) find an axial closure through the cover flange (8) connected with the first stabilizer part (1, 1') and through the bearing cover (9), wherein the free spaces between the outer rotary wing (14) and the inner rotary wing (6) are formed as pressure chambers sealed toward the outside and inside in a corresponding way and connected to a hydraulic plant.

18. The subdivided stabilizer according to claim 15 further comprising a bearing cover (9, 9'), wherein the outer rotary part has the shape of a cylindrical casing, wherein the outer rotary part (4, 4') is covered on a front side through a cover flange (8'), wherein the cover flange (8') is connected fixedly against rotation to the first stabilizer part (1, 1'), wherein the outer rotary part (4, 4') is delimited an a second front side with the bearing cover (9, 9'), wherein the inner rotary part (5, 5') is supported in a bore hole of the bearing cover (9, 9') and in a recess of the cover flange (8, 8').

19. The subdivided stabilizer according to claim 15 wherein the outer rotary wing (14) and the inner rotary wing (16) are intersected by a common radial plane.

20. The subdivided stabilizer according to claim 15 wherein the movable coupling piece (19) comprises two equal and oppositely disposed coupling parts (21) equipped with side ways and conically extending guide faces, wherein the coupling parts (21) are capable of closing the free spaces (18) between the outer rotary wing (14) and the inner rotary wing (16) without play;

wherein the coupling parts (21) are disengaged in the decoupled state from the outer rotary wing (14) and from the inner rotary wing (16) such that initially a free angle of rotation has to be overcome for each direction in case of a different load of the first stabilizer part (1, 1') and of the second stabilizer part (2, 2') before the outer rotary wing (14) and the inner rotary wing (16) come to rest.

21. A subdivided stabilizer
with optimized spring rate,
comprising a first stabilizer part (1, 1');

a cover flange (8'), wherein the first stabilizer part (1, 1') is formed as a single piece with the cover flange (8');

an outer rotary part (4'), wherein the cover flange (8') is formed at the outer rotary part (4');

an outer rotary wing (14) attached to the outer rotary part (4'), wherein the outer rotary wing (14) is radially inwardly directed;

an inner rotary wing (6, 16), wherein the inner rotary wing (6, 16) is radially outwardly directed;

an inner rotary part (5'), wherein the inner rotary wing (6, 16) is attached to the inner rotary part (5');

a second stabilizer part (2, 2'), wherein the second stabilizer part (2, 2') is attached to the inner rotary part (5, 5'), wherein the outer rotary part (4') with the outer rotary wing (14) moves relative the inner rotary part (5, 5') with the inner rotary wing (6, 16) up to a point where the outer rotary wing (14) contacts the inner rotary wing (6, 16), and wherein the first stabilizer part (1, 1') and the second stabilizer part (2, 2') are connected to each other with the outer rotary wing (14) and the inner rotary wing (6, 16), wherein the inner rotary part (5, 5') is rotatable relative to the outer rotary part (4') to a predetermined extent, wherein free spaces (18) for a movable coupling piece (19) exist between the outer rotary wing (14) and the inner rotary wing (6, 16); wherein the second stabilizer part (2') is formed as a single piece with the inner rotary part (5, 5'), a bearing cover (9) attached to the outer rotary part (4, 4'), wherein the outer rotary part (4) with its outer rotary wing (14) and the inner rotary part (5, 5) with its inner rotary wing (6, 16) find an axial closure through the cover flange (8) connected with the first stabilizer part (1, 1') and through the bearing cover (9), wherein the free spaces between the outer rotary wing (14) and the inner rotary wing (6, 16) are formed as pressure chambers sealed toward the outside and inside in a corresponding way and connected to a hydraulic plant, wherein the cover flange (8) is furnished on an inner side in a finite bearing hole (11) for receiving the second stabilizing part (2) with its inner rotary part (5, 5'), wherein
the bearing cover (9) comprises a passing through bearing bore (12) for receiving of the inner rotary part (5, 5'), wherein
both the bearing cover (9) and the cover flange (8) are attached at the outer rotary part (4) with screws or by a welding connection, wherein the inner rotary wing (6) is attached an the inner rotary part (5, 5') by gear teeth or by clamping.

22. The subdivided stabilizer according to claim 21 wherein the inner rotary part (5) forms one part with the second stabilizer (2, 2') and is supported by the bearing cover (9) and the cover flange (8).

23. The subdivided stabilizer according to claim 21 wherein the movable coupling piece (19) comprises two equal and oppositely disposed coupling parts (21) equipped with side ways and conically extending guide faces, wherein the coupling parts (21) are capable of closing the free spaces (18) between the outer rotary wing (14) and the inner rotary wing (16) without play;

wherein the coupling parts (21) are disengaged in the decoupled state from the outer rotary wing (14) and from the inner rotary wing (16) such that initially a free angle of rotation has to be overcome for each direction in case of a different load of the first stabilizer part (1, 1') and of the second stabilizer part (2, 2') before the outer rotary wing (14) and the inner rotary wing (16) come to rest.

24. The subdivided stabilizer according to claim 21 wherein the outer rotary wing (14) and the inner rotary wing (6) are freely rotatable relative to each other in a region of the free spaces (18) until the outer rotary wing (14) and the inner rotary wing (6) come to rest at a mutual stop.

25. The subdivided stabilizer with optimized spring rate, comprising a first stabilizer part (1, 1');

a cover flange (8'), wherein the first stabilizer part (1, 1') is formed as a single piece with the cover flange (8');

an outer rotary part (4'), wherein the cover flange (8') is formed at the outer rotary part (4');

an outer rotary wing (14) attached to the outer rotary part (4'), wherein the outer rotary wing (14) is radially inwardly directed;

an inner rotary wing (16), wherein the inner rotary wing (6, 16) is radially outwardly directed;

an inner rotary part (5'), wherein the inner rotary wing (6, 16) is attached to the inner rotary part (5');

a second stabilizer part (2, 2'), wherein the second stabilizer part (2, 2') is attached to the inner rotary part (5'), wherein the outer rotary part (4') with the outer rotary wing (14) moves relative the inner rotary part (5') with the inner rotary wing (16) up to a point where the outer rotary wing (14) contacts the inner rotary wing (16), and wherein the first stabilizer part (1, 1') and the second stabilizer part (2, 2') are connected to each other with the outer rotary wing (14) and the inner rotary wing (16), wherein the inner rotary part (5') is rotatable relative to the outer rotary part (4') to a predetermined extent, wherein free spaces (18) for a movable coupling piece (19) exist between the outer rotary wing (14) and the inner rotary wing (16); wherein the second stabilizer part (2') is formed as a single piece with the inner rotary part (5'), a bearing cover (9) attached to the outer rotary part (4, 4'), wherein the outer rotary part (4) with its outer rotary wing (14) and the inner rotary part (5) with its inner rotary wing (6) find an axial closure through the cover flange (8) connected with the first stabilizer part (1, 1') and through the bearing cover (9), wherein the free spaces between the outer rotary wing (14) and the inner rotary wing (6) are formed as pressure chambers sealed toward the outside and inside in a corresponding way and connected to a hydraulic plant, a compression spring (22) supported at the bearing cover (9') and disposed in a spring chamber (23), wherein the spring chamber (23) is formed as a pressure space and connected to a hydraulic plant through an inlet connection piece (24), wherein the coupling piece (19) is loadable with a hydraulic pressure created in the spring chamber (23) opposing the compression spring (22) on the side disposed remote from the compression spring (22), wherein the hydraulic pressure supports the force of the compression spring (22), wherein a corresponding inlet opening (25) for a hydraulic pressure creation is disposed in the cover flange (8').

26. The subdivided stabilizer according to claim 25 wherein the movable coupling piece (19) comprises two equal and oppositely disposed coupling parts (21) equipped with side ways and conically extending guide faces, wherein the coupling parts (21) are capable of closing the free spaces (18) between the outer rotary wing (14) and the inner rotary wing (16) without play;

wherein the coupling parts (21) are disengaged in the decoupled state from the outer rotary wing (14) and from the inner rotary wing (16) such that initially a free angle of rotation has to be overcome for each direction in case of a different load of the first stabilizer part (1, 1') and of the second stabilizer part (2, 2') before the outer rotary wing (14) and the inner rotary wing (16) come to rest.

27. The subdivided stabilizer according to claim 25 wherein the second stabilizer part (2, 2') and the inner rotary part (5, 5')are furnished by a round rod; and wherein the first stabilizer part (1, 1') is at its end axially aligned attached to the cover flange (8, 8').

28. The subdivided stabilizer according to claim 25 wherein the outer rotary wing (14) and the inner rotary wing (6) are freely rotatable relative to each other in a region of the free spaces (18) until the outer rotary wing (14) and the inner rotary wing (6) come to rest at a mutual stop.

29. The subdivided stabilizer according to claim 25 wherein the inner rotary part (5) forms one part with the second stabilizer (2, 2') and is supported by the bearing cover (9) and the cover flange (8).

30. The subdivided stabilizer according to claim 25 wherein the inner rotary wing (16) is disposed an a radial plane together with the outer rotary wing (14) of the outer rotary part (4'), wherein the outer rotary wing (14) and the inner rotary wing (16) extend over a certain axial length, wherein the inner rotary wing (16) and the outer rotary wing are of such dimensions and disposed such to each other that the inner rotary wing (16) and the outer rotary ring (14) form two radially and oppositely disposed free spaces (18) between themselves.

31. A subdivided stabilizer with optimized spring rate, comprising a first stabilizer part (1, 1');

a cover flange (8'), wherein the first stabilizer part (1, 1') is formed as a single piece with the cover flange (8');

an outer rotary part (4'), wherein the cover flange (8') is formed at the outer rotary part (4');

an outer rotary wing (14) attached to the outer rotary part (4'), wherein the outer rotary wing (14) is radially inwardly directed;

an inner rotary wing (16), wherein the inner rotary wing (6, 16) is radially outwardly directed;

an inner rotary part (5'), wherein the inner rotary wing (6, 16) is attached to the inner rotary part (5');

a second stabilizer part (2, 2'), wherein the second stabilizer part (2, 2') is attached to the inner rotary part (5'), wherein the outer rotary part (4') with the outer rotary wing (14) moves relative the inner rotary part (5') with the inner rotary wing (16) up to a point where the outer rotary wing (14) contacts the inner rotary wing (16), and wherein the first stabilizer part (1, 1') and the second stabilizer part (2, 2') are connected to each other with the outer rotary wing (14) and the inner rotary wing (16), wherein the inner rotary part (5') is rotatable relative to the outer rotary part (4') to a predetermined extent, wherein free spaces (18) for a movable coupling piece (19) exist between the outer rotary wing (14) and the inner rotary wing (16); wherein the second stabilizer part (2') is formed as a single piece with the inner rotary part (5'), wherein the movable coupling piece (19) comprises a guide part (20) and two equal and oppositely disposed coupling parts (21) equipped with side ways and conically extending guide faces, wherein the coupling parts (21) are capable of closing the free spaces (18) between the outer rotary wing (14) and the inner rotary wing (16) without play.

32. The subdivided stabilizer according to claim 27 further comprising a force transfer element (15) connected fixed against rotation to the inner rotary part (5), wherein the force transfer element (15) forms a single part with the inner rotary wing (16).

33. The subdivided stabilizer according to claim 31 wherein the movable coupling piece (19) comprises two equal and oppositely disposed coupling parts (21) equipped with side ways and conically extending guide faces, wherein the coupling parts (21) are capable of closing the free spaces (18) between the outer rotary wing (14) and the inner rotary wing (16) without play;

wherein the coupling parts (21) are disengaged in the decoupled state from the outer rotary wing (14) and from the inner rotary wing (16) such that initially a free angle of rotation has to be overcome for each direction in case of a different load of the first stabilizer part (1, 1') and of the second stabilizer part (2, 2') before the outer rotary wing (14) and the inner rotary wing (16) come to rest.

34. The subdivided stabilizer according to claim 31 wherein the cover flange (8) is furnished on an inner side in a finite bearing hole (11) for receiving the second stabilizing part (2) with its inner rotary part (5), wherein a bearing cover (9) comprises a passing through bearing bore (12) for receiving of the inner rotary part (5), wherein both the bearing cover (9) and the cover flange (8) are attached at the outer rotary part (4) with screws or by a welding connection, wherein the inner rotary wing (6) is attached an the inner rotary part (5) by gear teeth or by clamping.

35. The subdivided stabilizer according to claim 27 further comprising a compression spring (22) supported at a bearing cover (9') and disposed in a spring chamber (23), wherein the spring chamber (23) is formed as a pressure space and connected to a hydraulic plant through an inlet connection piece (24), wherein the coupling piece (19) is loadable with a hydraulic pressure created in the spring chamber (23) opposing the compression spring (22) an the side disposed remote from the compression spring (22), wherein the hydraulic pressure supports the force of the compression spring (22), wherein a corresponding inlet opening (25) for a hydraulic pressure creation is disposed in the cover flange (8').

36. The subdivided stabilizer according to claim 27 further comprising a bearing cover (9, 9'), wherein the outer rotary part has the shape of a cylindrical casing, wherein the outer rotary part (4, 4') is covered an a front side through a cover flange (8'), wherein the cover flange (8') is connected fixedly against rotation to the first stabilizer part (1, 1'), wherein the outer rotary part (4, 4') is delimited an a second front side with the bearing cover (9, 9'), wherein the inner rotary part (5, 5') is supported in a bore hole of the bearing cover (9, 9') and in a recess of the cover flange (8, 8').

37. The subdivided stabilizer according to claim 31 wherein the outer rotary wing (14) and the inner rotary wing (16) are intersected by a common radial plane.

38. A subdivided stabilizer
with optimized spring rate,
comprising a first stabilizer part (1, 1');

a cover flange (8'), wherein the first stabilizer part (1, 1') is formed as a single piece with the cover flange (8');

an outer rotary part (4'), wherein the cover flange (8') is formed at the outer rotary part (4');

an outer rotary wing (14) attached to the outer rotary part (4'), wherein the outer rotary wing (14) is radially inwardly directed;

an inner rotary wing (16), wherein the inner rotary wing (6, 16) is radially outwardly directed;

an inner rotary part (5'), wherein the inner rotary wing (6, 16) is attached to the inner rotary part (5');

a second stabilizer part (2, 2'), wherein the second stabilizer part (2, 2') is attached to the inner rotary part (5'), wherein the outer rotary part (4') with the outer rotary wing (14) moves relative the inner rotary part (5') with the inner rotary wing (16) up to a point where the outer rotary wing (14) contacts the inner rotary wing (16), and wherein the first stabilizer part (1, 1') and the second stabilizer part (2, 2') are connected to each other with the outer rotary wing (14) and the inner rotary wing (16), wherein the inner rotary part (5') is rotatable relative to the outer rotary part (4') to a predetermined extent, wherein free spaces (18) for a movable coupling piece (19) exist between the outer rotary wing (14) and the inner rotary wing (16); wherein the second stabilizer part (2') is formed as a single piece with the inner rotary part (5'), a sensor (26) for determining a position of the movable coupling piece (19) disposed in the outer rotary part (4').

39. The subdivided stabilizer according to claim 38 further comprising a force transfer element (15) connected fixed against rotation to the inner rotary part (5), wherein the force transfer element (15) forms a single part with the inner rotary wing (16).

40. The subdivided stabilizer according to claim 38 wherein the movable coupling piece (19) comprises two equal and oppositely disposed coupling parts (21) equipped with side ways and conically extending guide faces, wherein the coupling parts (21) are capable of closing the free spaces (18) between the outer rotary wing (14) and the inner rotary wing (16) without play;

wherein the coupling parts (21) are disengaged in the decoupled state from the outer rotary wing (14) and from the inner rotary wing (16) such that initially a free angle of rotation has to be overcome for each direction in case of a different load of the first stabilizer part (1, 1') and of the second stabilizer part (2, 2') before the outer rotary wing (14) and the inner rotary wing (16) come to rest.

41. The subdivided stabilizer according to claim 38 wherein the second stabilizer part (2, 2') and the inner rotary part (5, 5') are furnished by a round rod; and
wherein the first stabilizer part (1, 2') is at its end axially aligned attached to the cover flange (8, 8').

42. The subdivided stabilizer according to claim 38 wherein the outer rotary wing (14) and the inner rotary wing (6) are freely rotatable relative to each other in a region of the free spaces (18) until the outer rotary wing (14) and the inner rotary wing (6) come to rest at a mutual stop.

43. The subdivided stabilizer according to claim 38 further comprising
a bearing cover (9) attached to the outer rotary part (4, 4'), wherein the outer rotary part (4) with its outer rotary wing (14) and the inner rotary part (5) with its inner rotary wing (6) find an axial closure through the cover flange (8) connected with the first stabilizer part (1, 1') and through the bearing cover (9), wherein the free spaces between the outer rotary wing (14) and the inner rotary wing (6) are formed as pressure chambers sealed toward the outside and inside in a corresponding way and connected to a hydraulic plant.

44. The subdivided stabilizer according to claim 38 wherein the cover flange (8) is furnished on an inner side in a finite bearing hole (11) for receiving the second stabilizing part (2) with its inner rotary part (5),
wherein
a bearing cover (9) comprises a passing through bearing bore (12) for receiving of the inner rotary part (5),
wherein
both the bearing cover (9) and the cover flange (8) are attached at the outer rotary part (4) with screws or by a welding connection,
wherein the inner rotary wing (6) is attached an the inner rotary part (5) by gear teeth or by clamping.

45. The subdivided stabilizer according to claim 38 further comprising
a compression spring (22) supported at a bearing cover (9') and disposed in a spring chamber (23), wherein the spring chamber (23) is formed as a pressure space and connected to a hydraulic plant through an inlet connection piece (24),
wherein
the coupling piece (19) is loadable with a hydraulic pressure created in the spring chamber (23) opposing the compression spring (22) an the side disposed remote from the compression spring (22),
wherein the hydraulic pressure supports the force of the compression spring (22),
wherein a corresponding inlet opening (25) for a hydraulic pressure creation is disposed in the cover flange (8').

46. The subdivided stabilizer according to claim 38 wherein the movable coupling piece (19) comprises
a guide part (20) and two equal and oppositely disposed coupling parts (21) equipped with side ways and conically extending guide faces, wherein the coupling parts (21) are capable of closing the free spaces (18) between the outer rotary wing (14) and the inner rotary wing (16) without play.

47. The subdivided stabilizer according to claim 38 further comprising
a bearing cover (9, 9'), wherein the outer rotary part has the shape of a cylindrical casing, wherein the outer rotary part (4, 4') is covered an a front side through a cover flange (8'), wherein the cover flange (8') is connected fixedly against rotation to the first stabilizer part (1, 1'), wherein the outer rotary part (4, 4') is delimited an a second front side with the bearing cover (9, 9'), wherein the inner rotary part (5, 5') is supported in a bore hole of the bearing cover (9, 9') and in a recess of the cover flange (8, 8').

48. The subdivided stabilizer according to claim 38 wherein the inner rotary wing (16) is disposed an a radial plane together with the outer rotary wing (14) of the outer rotary part (4'), wherein the outer rotary wing (14) and the inner rotary wing (16) extend over a certain axial length, wherein the inner rotary wing (16) and the outer rotary wing are of such dimensions and disposed such to each other that the inner rotary wing (16) and the outer rotary ring (14) form two radially and oppositely disposed free spaces (18) between themselves.

49. The subdivided stabilizer according to claim 38 wherein the outer rotary wing (14) and the inner rotary wing (16) are intersected by a common radial plane.

50. A subdivided stabilizer
with optimized spring rate,
comprising
a first stabilizer part (1, 1');
a cover flange (8'), wherein the first stabilizer part (1, 1') is formed as a single piece with the cover flange (8');
an outer rotary part (4'), wherein the cover flange (8') is formed at the outer rotary part (4');
an outer rotary wing (14) attached to the outer rotary part (4'), wherein the outer rotary wing (14) is radially inwardly directed;
an inner rotary wing (16), wherein the inner rotary wing (6, 16) is radially outwardly directed;
an inner rotary part (5'), wherein the inner rotary wing (6, 16) is attached to the inner rotary part (5');
a second stabilizer part (2, 2'), wherein the second stabilizer part (2, 2') is attached to the inner rotary part (5'), wherein the outer rotary part (4') with the outer rotary wing (14) moves relative the inner rotary part (5') with the inner rotary wing (16) up to a point where the outer rotary wing (14) contacts the inner rotary wing (16), and wherein the first stabilizer part (1, 1') and the second stabilizer part (2, 2') are connected to each other with the outer rotary wing (14) and the inner rotary wing (16), wherein the inner rotary part (5') is rotatable relative to the outer rotary part (4') to a predetermined extent, wherein free spaces (18) for a movable coupling piece (19) exist between the outer rotary wing (14) and the inner rotary wing (16); wherein the second stabilizer part (2') is formed as a single piece with the inner rotary part (5'),
wherein the outer rotary wing (14) and the inner rotary wing (16) come to rest on a mutual stop.

51. The subdivided stabilizer according to claim 50 further comprising
a force transfer element (15) connected fixed against rotation to the inner rotary part (5), wherein the force transfer element (15) forms a single part with the inner rotary wing (16).

52. The subdivided stabilizer according to claim 50 wherein the cover flange (8) is furnished on an inner side in a finite bearing hole (11) for receiving the second stabilizing part (2) with its inner rotary part (5),
wherein
a bearing cover (9) comprises a passing through bearing bore (12) for receiving of the inner rotary part (5),
wherein both the bearing cover (9) and the cover flange (8) are attached at the outer rotary part (4) with screws or by a welding connection, wherein the inner rotary wing (6) is attached an the inner rotary part (5) by gear teeth or by clamping.

53. The subdivided stabilizer according to claim 50 further comprising a compression spring (22) supported at a bearing cover (9') and disposed in a spring chamber (23), wherein the spring chamber (23) is formed as a pressure space and connected to a hydraulic plant through an inlet connection piece (24), wherein the coupling piece (19) is loadable with a hydraulic pressure created in the spring chamber (23) opposing the compression spring (22) an the side disposed remote from the compression spring (22), wherein the hydraulic pressure supports the force of the compression spring (22), wherein a corresponding inlet opening (25) for a hydraulic pressure creation is disposed in the cover flange (8').

54. The subdivided stabilizer according to claim 50 wherein the inner rotary part (5) forms one part with the second stabilizer (2, 2') and is supported by a bearing cover (9) and the cover flange (8).

55. The subdivided stabilizer according to claim 50 wherein the movable coupling piece (19) comprises a guide part (20) and two equal and oppositely disposed coupling parts (21) equipped with side ways and conically extending guide faces, wherein the coupling parts (21) are capable of closing the free spaces (18) between the outer rotary wing (14) and the inner rotary wing (16) without play.

56. The subdivided stabilizer according to claim 50 further comprising a sensor (26) for determining a position of the movable coupling piece (19) disposed in the outer rotary part (4').

57. The subdivided stabilizer according to claim 50 wherein the inner rotary wing (16) is disposed an a radial plane together with the outer rotary wing (14) of the outer rotary part (4'), wherein the outer rotary wing (14) and the inner rotary wing (16) extend over a certain axial length, wherein the inner rotary wing (16) and the outer rotary wing are of such dimensions and disposed such to each other that the inner rotary wing (16) and the outer rotary ring (14) form two radially and oppositely disposed free spaces (18) between themselves.

58. The subdivided stabilizer according to claim 50 wherein the outer rotary wing (14) and the inner rotary wing (16) are intersected by a common radial plane.

* * * * *